United States Patent
Sprague et al.

(10) Patent No.: US 9,542,293 B2
(45) Date of Patent: Jan. 10, 2017

(54) METHOD AND SYSTEM FOR COLLECTING AND PRE-PROCESSING QUALITY OF SERVICE DATA IN A STORAGE SYSTEM

(71) Applicant: NETAPP, INC., Sunnyvale, CA (US)

(72) Inventors: Jason Sprague, Westford, MA (US); Jeremy Decker, Stow, MA (US)

(73) Assignee: NETAPP, INC., Sunnyvale, CA (US)

( * ) Notice: Subject to any disclaimer, the term of this patent is extended or adjusted under 35 U.S.C. 154(b) by 307 days.

(21) Appl. No.: 14/155,014

(22) Filed: Jan. 14, 2014

(65) Prior Publication Data

US 2015/0199253 A1    Jul. 16, 2015

(51) Int. Cl.
*G06F 15/173*     (2006.01)
*G06F 11/34*     (2006.01)

(52) U.S. Cl.
CPC ....... *G06F 11/3419* (2013.01); *G06F 11/3485* (2013.01)

(58) Field of Classification Search
None
See application file for complete search history.

(56) References Cited

U.S. PATENT DOCUMENTS

| | | | | |
|---|---|---|---|---|
| 6,622,221 B1* | 9/2003 | Zahavi | ......... | G06F 3/0601 703/2 |
| 7,640,342 B1* | 12/2009 | Aharoni | ......... | G06F 3/0605 370/237 |
| 8,775,549 B1* | 7/2014 | Taylor | ......... | H04L 67/1097 707/609 |
| 2005/0065977 A1* | 3/2005 | Benson | ......... | G06F 17/30575 |
| 2006/0112155 A1* | 5/2006 | Earl | ......... | G06F 17/30067 |
| 2009/0287744 A1* | 11/2009 | Bernardini | ......... | G06F 11/3419 |
| 2011/0087469 A1* | 4/2011 | Kumar | ......... | G06F 11/3447 703/2 |
| 2011/0295811 A1* | 12/2011 | Cherkasova | ......... | G06F 11/3419 707/654 |
| 2014/0215044 A1* | 7/2014 | Gulati | ......... | H04L 67/1097 709/223 |

\* cited by examiner

*Primary Examiner* — Joseph E Avellino
*Assistant Examiner* — Phyllis A Book
(74) *Attorney, Agent, or Firm* — Klein, O'Neill & Singh, LLP (57) ABSTRACT

Methods and systems for collecting and processing quality of service (QOS) data are provided. A collection module receives the QOS data from a storage operating system for a plurality of storage volumes at time t2, when a process for collecting the QOS data began at time t1 such that t2>t1. The collection module estimates a QOS data value for time t1 and provides the estimated QOS data value to a performance manager that uses the estimated QOS data value for monitoring QOS for the plurality of storage volumes using a plurality of resources for processing input/output (I/O) requests.

17 Claims, 7 Drawing Sheets

METHOD AND SYSTEM FOR COLLECTING AND PRE-PROCESSING QUALITY OF SERVICE DATA IN A STORAGE SYSTEM

TECHNICAL FIELD

The present disclosure relates to collecting and pre-processing quality of service (QOS) data in a storage system.

BACKGROUND

Various forms of storage systems are used today. These forms include direct attached storage (DAS) network attached storage (NAS) systems, storage area networks (SANs), and others. Network storage systems are commonly used for a variety of purposes, such as providing multiple clients with access to shared data, backing up data and others.

A storage system typically includes at least a computing system executing a storage operating system for storing and retrieving data on behalf of one or more client computing systems (may just be referred to as "client" or "clients"). The storage operating system stores and manages shared data containers in a set of mass storage devices.

Quality of Service (QOS) is used in a storage environment to provide certain throughput in processing input/output (I/O) requests, as well as a response time (i.e. latency) within, which I/O requests are processed. QOS may also include processing certain number of I/O requests per second (IOPS), which is associated with throughput. Throughput means an average rate at which data is transferred for I/O requests. Different QOS levels may be provided to different clients depending on client service levels.

To process an I/O request to read and/or write data, various resources are typically used within a storage system, for example, network resources, processors, storage devices and others. The different resources perform various functions for reading and writing information. The use of resources impact QOS for clients. For example, if a client 1 overuses a certain resource then it may delay I/O processing for a client 2, which may lower the QOS for client 2.

As storage systems continue to expand in size and operating speeds, it is desirable to efficiently monitor resource usage within the storage system and analyze QOS data so that any incidents based on abnormal QOS data can be identified and handled appropriately. The storage operating system typically maintains QOS data regarding various storage volumes that use the resources of the storage system. Continuous efforts are being made to efficiently collect and pre-process QOS data so that the data can be efficiently analyzed for identifying abnormal incidents that may impact overall I/O processing in compliance with QOS policies.

BRIEF DESCRIPTION OF THE DRAWINGS

The various features of the present disclosure will now be described with reference to the drawings of the various aspects. In the drawings, the same components may have the same reference numerals. The illustrated aspects are intended to illustrate, but not to limit the present disclosure. The drawings include the following Figures.

DETAILED DESCRIPTION

As a preliminary note, the terms "component", "module", "system," and the like as used herein are intended to refer to a computer-related entity, either software-executing general purpose processor, hardware, firmware and a combination thereof. For example, a component may be, but is not limited to being, a process running on a hardware processor, a hardware based processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, at non-transitory, computer readable media including, but not limited to, an ASIC (application specific integrated circuit), CD (compact disc), DVD (digital video disk), ROM (read only memory), floppy disk, hard disk, EEPROM (electrically erasable programmable read only memory), memory stick or any other storage device, in accordance with the claimed subject matter.

In one aspect, a performance manager module is provided for analyzing quality of service (QOS) data maintained by a storage operating system for processing input/output (I/O) requests for writing and reading data to and from storage devices. The storage system uses various resources to process the I/O requests. The QOS data may include a throughput rate, average number of IOPS that are processed by the storage operating system, average response time, a service time, a wait time, a visit time and a number of visits at each of the resources for processing the I/O requests. The performance manager uses the QOS data to predict an expected range (or threshold value) for future QOS data. Future QOS data can be compared with the expected range to detect abnormal behavior.

The performance manager needs QOS data for specific times or time intervals for predicting the expected range. In one aspect, a collection module is provided that interfaces with the storage operating system and polls the storage operating system for the QOS data for time intervals requested by the performance manager. The actual data however is received after a polling interval has begun. For example, if polling starts at time t0, then certain QOS data may not be received until time t1, where t1>to. In one aspect, as described below in detail, the collection module uses the data received at t1 to provide an estimate of what the data would have been at t0. Thus the performance manager receives the estimated data for the specific polling interval. This allows the performance manager to efficiently perform its analysis without having to pre-process the QOS data.

Figure 1:
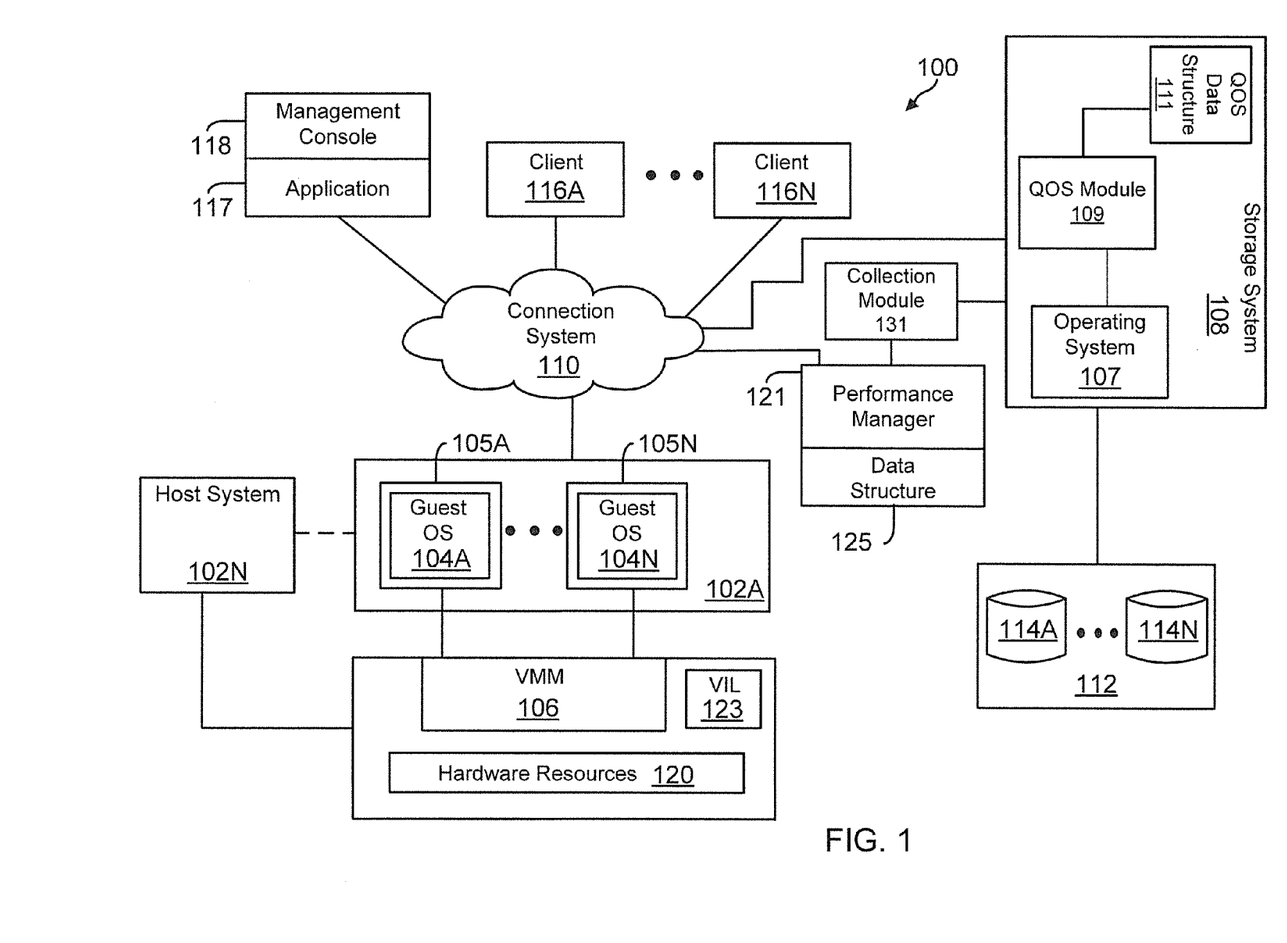
FIG. 1 shows an example of an operating environment for the various aspects disclosed herein.

System 100:

FIG. 1 shows an example of a system 100, where the adaptive aspects disclosed herein may be implemented. A collection module 131 interfaces with a storage operating system 107 for a storage system 108 to collect and process QOS data, according to one aspect. The collection module 131 pre-processes the collected data such that the data corresponds to a time interval expected by the performance manager 121, as described below.

QOS provides a certain throughput, latency and an average number of IOPS (I/O requests processed in a second) for clients 116A-116N. The I/O operations may be read and/or write requests for reading and/or writing data at storage devices. Throughput means average amount of data transferred within certain duration, for example, a second. Latency means a delay in processing an I/O request and may be measured by an average response time in processing client I/O requests.

Collection module 131 interfaces with the storage operating system 107 for receiving QOS data. The QOS data may include throughput information, an average response time, service time, wait time, and a number of visits at a plurality of storage system 108 resources used for processing I/O requests; or any other QOS data type. The QOS data is pre-processed and provided to the performance manager 121 that stores the pre-processed QOS data at a local data structure 125. The performance manager 121 then analyzes the QOS data for predicting abnormal behavior.

The storage operating system 107 maintains a large amount of QOS data for various storage volumes (defined below) and their associated clients. The collection module 131 starts the collection process based on a polling interval that is specified by the performance manager 121. However, the data that is received from the storage operating system 107 does not exactly match the time and the polling interval. The collection module 131 receives the QOS data and as described below in detail, estimates (i.e. pre-processes or transforms) what the data would have been if it was received at the time requested by the performance manager 121. This allows the performance manager 121 to simply take the pre-processed QOS data from the collection module 121 and perform its analysis to ensure that abnormal incidents are being addressed.

In one aspect, the storage system 108 has access to a set of mass storage devices 114A-114N (may be referred to as storage devices 114 or simply as storage device 114) within at least one storage subsystem 112. The storage devices 114 may include writable storage device media such as magnetic disks, video tape, optical, DVD, magnetic tape, non-volatile memory devices for example, solid state drives (SSDs) including self-encrypting drives, flash memory devices and any other similar media adapted to store information. The storage devices 114 may be organized as one or more groups of Redundant Array of Independent (or Inexpensive) Disks (RAID). The various aspects disclosed are not limited to any particular storage device type or storage device configuration.

In one aspect, the storage system 108 provides a set of logical storage volumes (may be interchangeably referred to as volume or storage volume) for providing physical storage space to clients 116A-116N (or virtual machines 105A-105N). A storage volume is a logical storage object and typically includes a file system in a NAS environment or a logical unit number (LUN) in a SAN environment.

Each storage volume may be configured to store data files (or data containers or data objects), scripts, word processing documents, executable programs, and any other type of structured or unstructured data. From the perspective of one of the client systems, each storage volume can appear to be a single drive. However, each storage volume can represent storage space in at one storage device, an aggregate of some or all of the storage space in multiple storage devices, a RAID group, or any other suitable set of storage space.

When a storage volume is created, a QOS policy may be associated with the storage volume such that requests associated with the storage volume can be managed appropriately. The QOS policy may be a part of a QOS policy group (referred to as "Policy Group" and shown as QOS data structure 111) that is used to manage QOS for different storage volumes. QOS at the storage system level may be implemented by a QOS module 109 that maintains the QOS data structure 111. QOS module 109 maintains various QOS data types that are provided to the collection module 131, as described below.

The storage operating system 107 organizes physical storage space at storage devices 114 as one or more "aggregate", where each aggregate is a logical grouping of physical storage identified by a unique identifier and a location. The aggregate includes a certain amount of storage space that can be expanded. Within each aggregate, one or more storage volumes are created whose size can be varied. A qtree, sub-volume unit may also be created within the storage volumes. For QOS management, each aggregate and the storage devices within the aggregates are considered as resources that are used by storage volumes.

The storage system 108 may be used to store and manage information at storage devices 114 based on an I/O request. The request may be based on file-based access protocols, for example, the Common Internet File System (CIFS) protocol or Network File System (NFS) protocol, over the Transmission Control Protocol/Internet Protocol (TCP/IP). Alternatively, the request may use block-based access protocols, for example, the Small Computer Systems Interface (SCSI) protocol encapsulated over TCP (iSCSI) and SCSI encapsulated over Fibre Channel (FCP).

In a typical mode of operation, a client (or a virtual machine) transmits one or more I/O request, such as a CFS or NFS read or write request, over connection system 110 to the storage system 108. Storage operating system 107 receives the request, issues one or more I/O commands to storage devices 114 to read or write the data on behalf of the client system, and issues a CIFS or NFS response containing the requested data over the network 110 to the respective client system.

Although storage system 108 is shown as a stand-alone system, i.e. a non-cluster based system, in another aspect, storage system 108 may have a distributed architecture; for example, a cluster based system that is described below in detail with respect to FIG. 2A.

System 100 may include a virtual machine environment where a physical resource is time-shared among a plurality of independently operating processor executable virtual machines (VMs). Each VM may function as a self-contained platform, running its own operating system (OS) and computer executable, application software. The computer executable instructions running in a VM may be collectively referred to herein as "guest software." In addition, resources available within the VM may be referred to herein as "guest resources."

The guest software expects to operate as if it were running on a dedicated computer rather than in a VM. That is, the guest software expects to control various events and have access to hardware resources on a physical computing system (may also be referred to as a host platform or host system) which maybe referred to herein as "host hardware resources". The host hardware resource may include one or more processors, resources resident on the processors (e.g., control registers, caches and others), memory (instructions residing in memory, e.g., descriptor tables), and other resources (e.g., input/output devices, host attached storage, network attached storage or other like storage) that reside in a physical machine or are coupled to the host system.

In one aspect, system 100 may include a plurality of computing systems 102A-102N (may also be referred to individually as host platform/system 102 or simply as server 102) communicably coupled to the storage system 108 executing the storage operating system 107 via a connection system 110 such as a local area network (LAN), wide area network (WAN), the Internet or any other interconnect type. As described herein, the term "communicably coupled" may refer to a direct connection, a network connection, a wireless connection or other connections to enable communication between devices.

Host system 102 includes a processor executable virtual execution environment executing a plurality of VMs 105A-105N that may be presented to client computing devices/systems 116A-116N. VMs 105A-105N execute a plurality of guest OS 104A-104N (may also be referred to as guest OS 104) that share hardware resources 120. As described above, hardware resources 120 may include processors, memory, I/O devices, storage or any other hardware resource.

In one aspect, host system 102 interfaces with a virtual machine monitor (VMM) 106, for example, a processor executed Hyper-V layer provided by Microsoft Corporation of Redmond, Wash., a hypervisor layer provided by VMWare Inc., or any other type. VMM 106 presents and manages the plurality of guest OS 104A-104N executed by the host system 102. The VMM 106 may include or interface with a virtualization layer (VIL) 123 that provides one or more virtualized hardware resource to each OS 104A-104N.

In one aspect, VMM 106 is executed by host system 102 with VMs 105A-105N. In another aspect, VMM 106 may be executed by an independent stand-alone computing system, often referred to as a hypervisor server or VMM server and VMs 105A-105N are presented at one or more computing systems.

It is noteworthy that different vendors provide different virtualization environments, for example, VMware Corporation, Microsoft Corporation and others. The generic virtualization environment described above with respect to FIG. 1 may be customized to implement the aspects of the present disclosure. Furthermore, VMM 106 (or VIL 123) may execute other modules, for example, a storage driver, network interface and others, the details of which are not germane to the aspects described herein and hence have not been described in detail.

System 100 may also include a management console 118 that executes a processor executable management application 117 for managing and configuring various elements of system 100. Application 117 may be used to manage and configure VMs as well as configure resources that are used by VMs, according to one aspect. It is noteworthy that although a single management console 118 is shown in FIG. 1, system 100 may include other management consoles performing certain functions, for example, managing storage systems, managing network connections and other functions described below.

In one aspect, application 117 may be used to present storage space that is managed by storage system 108 to clients' 116A-116N (or VMs 105A-105N). The clients may be grouped into different service levels, where a client with a higher service level may be provided with more storage space than a client with a lower service level. A client at a higher level may also be provided with better QOS vis-à-vis a client at a lower level.

Before describing the details of process steps executed by the collection module 131, the following provides a description of a clustered storage system from where QOS data is collected.

Figure 2A:
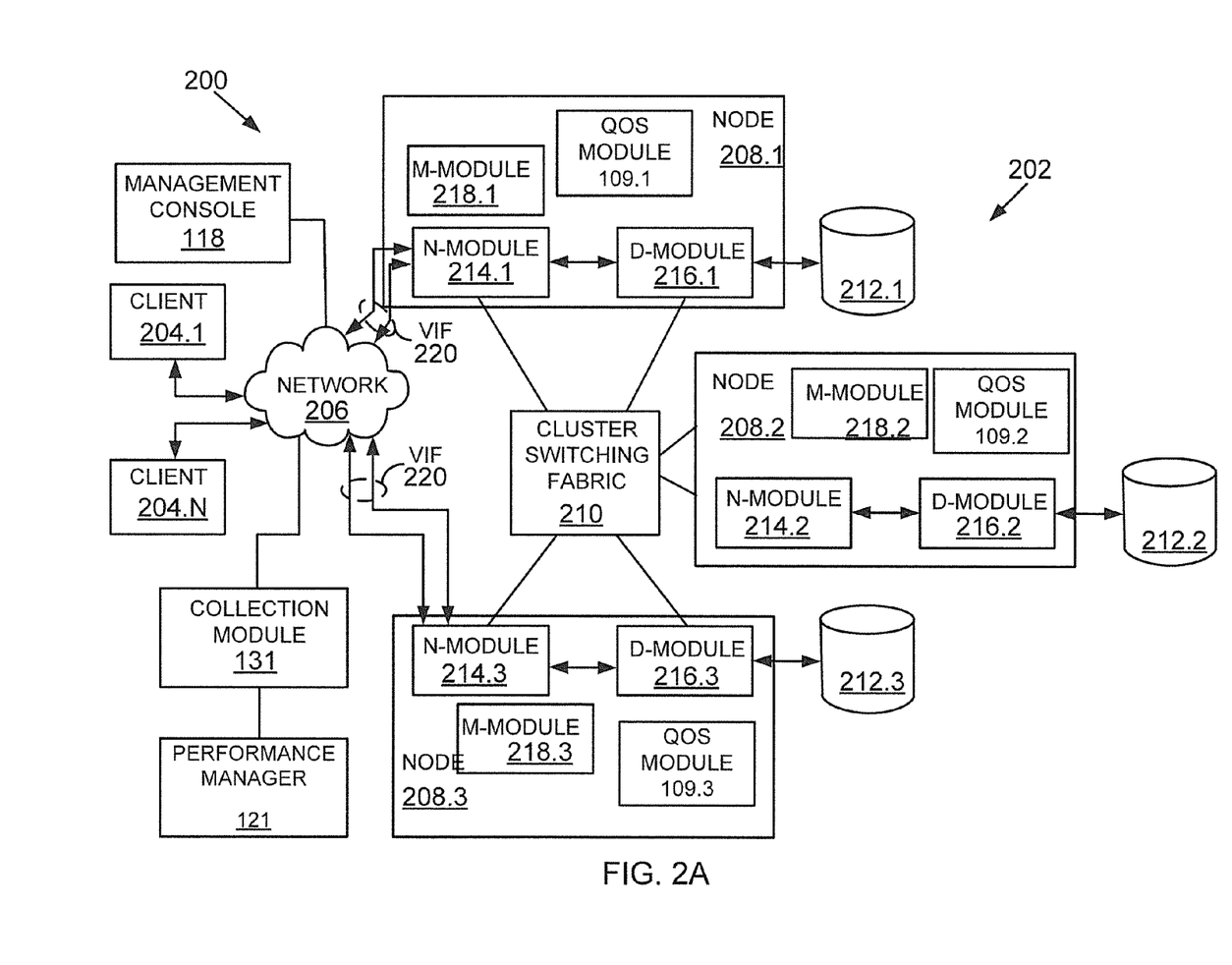
FIG. 2A shows an example of a clustered storage system, used according to one aspect.

Clustered Storage System:

FIG. 2A shows a cluster based storage environment 200 having a plurality of nodes for managing storage devices, according to one aspect. Storage environment 200 may include a plurality of client systems 204.1-204.N (similar to clients 116A-116N, FIG. 1), a clustered storage system 202, the collection module 131, the performance manager 121, the management console 118 and at least a network 206 communicably connecting the client systems 204.1-204.N and the clustered storage system 202.

The clustered storage system 202 includes a plurality of nodes 208.1-208.3, a cluster switching fabric 210, and a plurality of mass storage devices 212.1-212.3 (may be referred to as 212 and similar to storage device 114). Each of the plurality of nodes 208.1-208.3 is configured to include an N-module, a D-module, and an M-Module, each of which can be implemented as a processor executable module. Specifically, node 208.1 includes an N-module 214.1, a D-module 216.1, and an M-Module 218.1, node 208.2 includes an N-module 214.2, a D-module 216.2, and an M-Module 218.2, and node 208.3 includes an N-module 214.3, a D-module 216.3, and an M-Module 218.3.

The N-modules 214.1-214.3 include functionality that enable the respective nodes 208.1-208.3 to connect to one or more of the client systems 204.1-204.N over the computer network 206, while the D-modules 216.1-216.3 connect to one or more of the storage devices 212.1-212.3. Accordingly, each of the plurality of nodes 208.1-208.3 in the clustered storage server arrangement provides the functionality of a storage server.

The M-Modules 218.1-218.3 provide management functions for the clustered storage system 202. The M-Modules 218.1-218.3 collect storage information regarding storage devices 212.

Each node may execute or interface with a QOS module, shown as 109.1-109.3 that is similar to the QOS module 109 of FIG. 1. The QOS module 109 may be executed for each node or a single QOS module may be used for the entire cluster. The aspects disclosed herein are not limited to the number of instances of QOS module 109 that may be used in a cluster.

A switched virtualization layer including a plurality of virtual interfaces (VIFs) 220 is provided to interface between the respective N-modules 214.1-214.3 and the client systems 204.1-204.N, allowing storage 212.1-212.3 associated with the nodes 208.1-208.3 to be presented to the client systems 204.1-204.N as a single shared storage pool.

The clustered storage system 202 can be organized into any suitable number of virtual servers (also referred to as "vservers" or storage virtual machines), in which each vserver represents a single storage system namespace with separate network access. Each vserver has a client domain and a security domain that are separate from the client and security domains of other vservers. Moreover, each vserver is associated with one or more VIFs and can span one or more physical nodes, each of which can hold one or more VIFs and storage associated with one or more vservers. Client systems can access the data on a vserver from any node of the clustered system, through the VIFs associated with that vserver. It is noteworthy that the aspects described herein are not limited to the use of vservers.

Each of the nodes 208.1-208.3 is defined as a computing system to provide application services to one or more of the client systems 204.1-204.N. The nodes 208.1-208.3 are interconnected by the switching fabric 210, which, for example, may be embodied as a Gigabit Ethernet switch or any other type of switching/connecting device.

Although FIG. 2A depicts an equal number (i.e., 3) of the N-modules 214.1-214.3, the D-modules 216.1-216.3, and the M-Modules 218.1-218.3, any other suitable number of N-modules, D-modules, and M-Modules may be provided. There may also be different numbers of N-modules, D-modules, and/or M-Modules within the clustered storage system 202. For example, in alternative aspects, the clustered storage system 202 may include a plurality of N-modules and a plurality of D-modules interconnected in a configuration that does not reflect a one-to-one correspondence between the N-modules and D-modules.

Each client system 204.1-204.N may request the services of one of the respective nodes 208.1, 208.2, 208.3, and that node may return the results of the services requested by the client system by exchanging packets over the computer network 206, which may be wire-based, optical fiber, wireless, or any other suitable combination thereof.

Collection module 131 interfaces with the various nodes and obtains QOS data that is pre-processed and provided to the performance manager 121 for analysis. Details regarding the various modules of collection module 131 are now described with respect to FIG. 2B.

Figure 2B:
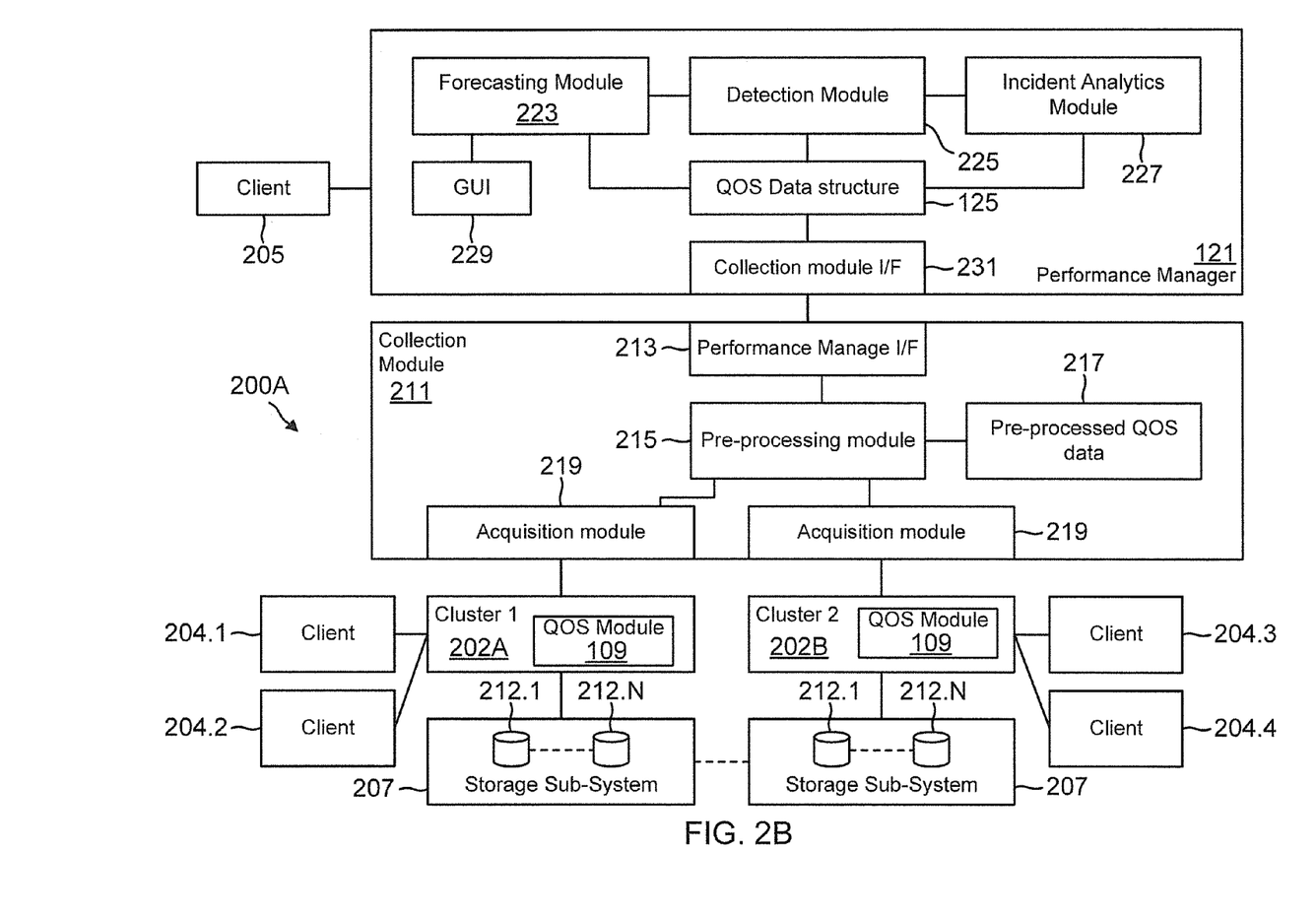
FIG. 2B shows an example of a collection module for collecting and pre-processing QOS (quality of service) data, according to one aspect.

Collection Module 211:

FIG. 2B shows a block diagram of system 200A with details regarding a collection module 211 and performance manager 121, according to one aspect. The collection module 211 may be a standalone computing device or integrated with performance manager 121. The aspects described herein are not limited to any particular configuration of collection module 211 and performance manager 121.

As an example, system 200A shows two clusters 202A and 202B, both similar to cluster 202 described above. Each cluster includes the QOS module 109 for implementing QOS policies that are established for different clients/applications.

Cluster 1 202A may be accessible to clients 204.1 and 204.2, while cluster 2 202B is accessible to clients 204.3/204.4. Both clusters have access to storage subsystems 207 and storage devices 212.1/212.N.

Clusters 202A and 202B communicate with the collection module 211 for providing QOS data. Collection module 131 may use a Zephyr Application Programming Interface (ZAPI) or any other interface type to communicate with clusters 202A and 202B. The various aspects disclosed herein are not limited to any particular interface type.

Collection module 211 includes one or more acquisition modules 219 for collecting the QOS data from the clusters. The data is pre-processed by the pre-processing module 215 and stored as pre-processed QOS data 217 at a storage device. Pre-processing module 215 formats the collected QOS data for the performance manager 121, as described below in detail. Pre-processed QOS data 217 is then provided to a collection module interface 231 of the performance manager 121. QOS data received from collection module 211 is stored as QOS data 125 by performance manager 121 at a storage device (not shown).

Performance manager 121 includes a plurality of modules, for example, a forecasting module 223 that predicts an expected range for the pre-processed QOS data, a detection module 225 that detects an abnormal incident and an incident analysis module 227 that analyzes the QOS data 125 for abnormal incidents and reports the incidents to a client system 205 via a GUI 229. Performance manager 121 may also recommend a corrective action plan to client 205.

Figure 3A:
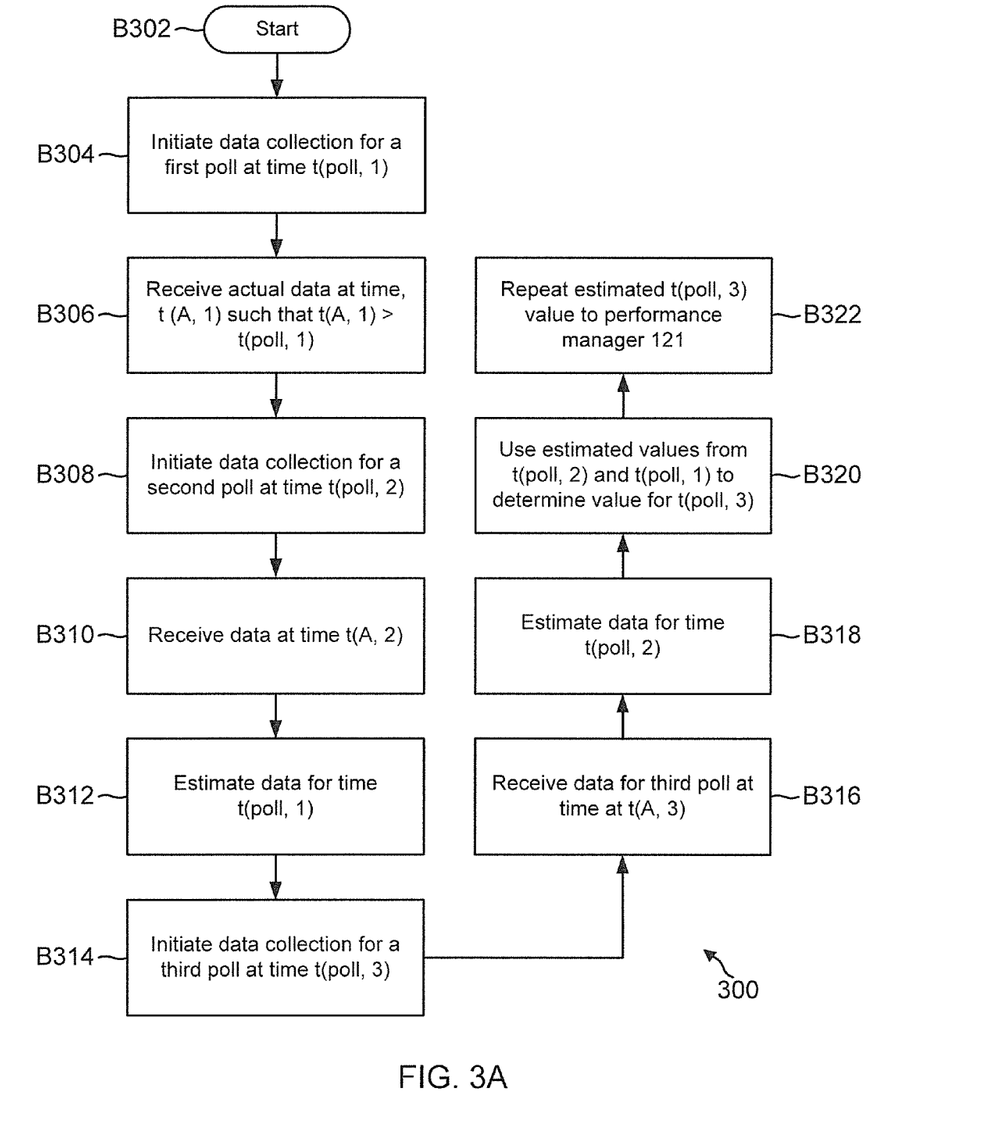
FIG. 3A shows a process flow diagram for pre-processing collected QOS data, according to one aspect.

Process Flow:

FIG. 3A shows a process 300 for collecting and pre-processing QOS data by the collection module 131, according to one aspect. The process begins in block B302, when the storage operating system 107 and the collection module 131 are initialized and are operational. The collection module 131 interfaces with the performance manage 121 to determine the time interval for collecting QOS data. The performance manager 121 may indicate that it needs QOS data every five minutes or any other interval. The performance manager 121 may also specify the QOS data type, for example, throughput data, average response time, number of visits to a resource, wait times at a resource and any other QOS data type.

In block B304, the collection module 131 may initiate QOS data collection for a first poll at time t (poll,1). In block B306, the actual data for the first poll is received by the collection module 131 at time t (A,1) such that t(A,1) is greater than t(poll,1).

In block B308, a second poll for the QOS data is initiated at time t(poll,2). The actual data for the second poll is received in block B310 at time t (A,2), where again t (A,2) is greater than (t (poll,2).

In block B312, the collection module 131 estimates the data that would have been received at time t(poll,1). In one aspect, the collection module 131 estimates the data by performing a linear extrapolation operation using the data received at t(A,1) and t(A,2).

In block B314, the collection module 131 initializes collection for a third poll at time t (poll,3). The actual data is received in block B316 at time t (A,3) where t(A,3) is greater than t(poll, 3).

In block B318, the collection module 131 uses the actual data received at time t(A,3) and actual data received at time t(A,2) to estimate the data value that would have been received at t(poll,2). The collection module 131 uses linear extrapolation for estimating the data value that would have been received at t(poll,2).

Thereafter, in block B320, the collection module estimates a data value that would have been received at t(poll,3). For example, if throughout is the QOS data that is being collected for performance manager 121, then the following equation may be used to estimate the reported throughput value at t (poll,3):

Throughput ($t$(poll,3)=Estimated Value at $t$(poll,3)− Estimated Value at $t$(poll,2)/Polling Interval ($t$(poll,3)−$t$(poll,2)

Thereafter, in block B322, the collection module 131 reports the estimated value at t(poll,3) to the performance manager 121.

Process 300 repeats steps B308-B322, for receiving actual data for next polling intervals (i.e. t(poll,4), t(poll,5) and so forth) and estimating the data for times that the performance manager 121 is expecting the data.

Figure 3B:
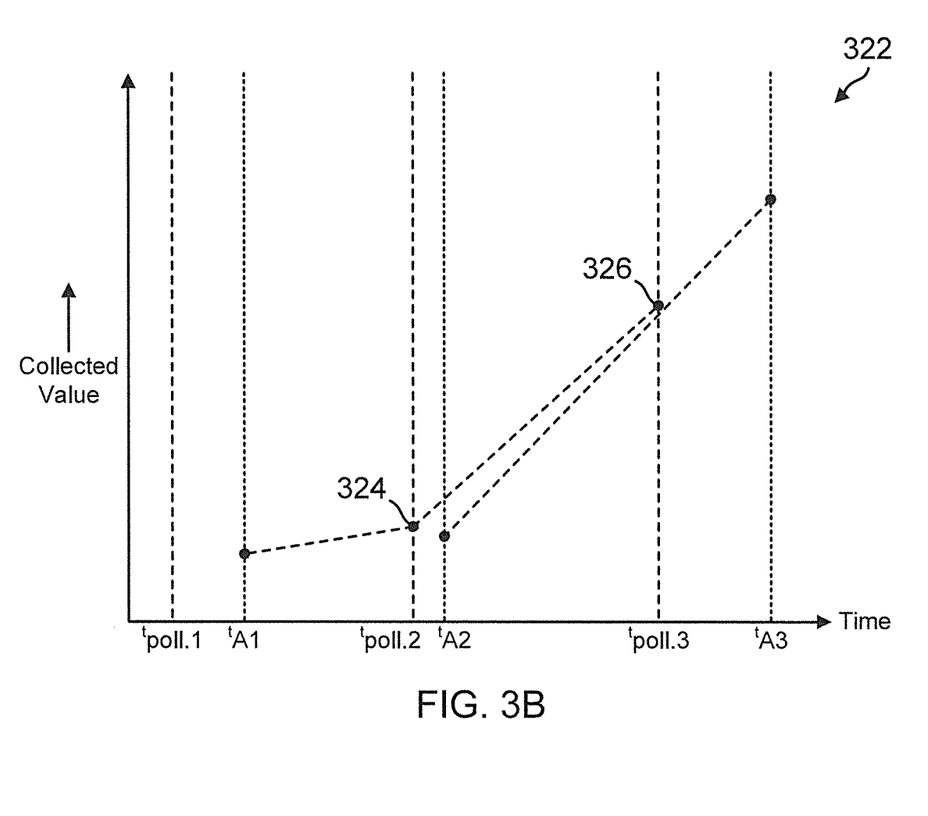
FIG. 3B shows a graphical illustration for pre-processing collected QOS data, according to one aspect.

FIG. 3B shows a graphical illustration 322 for estimating the QOS data values, based on process 300 described above. The actual collected values are shown on the y-axis, while time is shown on the x-axis. Polling intervals are shown as t(poll,1), t(poll,2), t(poll,3) and so forth. The estimated values for t (poll,1) and t(poll,2) are shown as 324 and 326, respectively.

Process 300 has advantages because the collection module 131 collects and pre-processes QOS data for the performance manager 121 so that the performance manager 121 can perform its analysis for identifying abnormal incidents without having to collect and pre-processing collected data.

In one aspect, the collection module 131 maintains a plurality of counters for collecting QOS data from storage operating system 107. When "null" data is received from the storage operating system 107 indicating that there was no change from a previous interval is not reported to the performance manager 121. This may be referred to as "zero suppression". This is efficient for performance manager 121 that does not have to store "null" data. Considering that performance manager 121 gets a large amount of data for different QOS data types and different storage volumes, zero suppression can result in reduction of significant data processing time.

Performance manager 121 uses a certain minimal amount of QOS data (for example, QOS data for 3 hours or 30 data samples). Performance manager 121 measures the performance of different workloads on a cluster based dynamically generated threshold values (or an expected range) based on historical QOS data. Performance manager 121 compares actual workload QOS data to the expected range for the QOS data. A workload that reaches the threshold value may then trigger an "incident", which is then analyzed for corrective action.

Various resources are used within a cluster to process I/O requests. As an example, there are two types of resources, a service center and a delay center. The service center is a resource category that can be represented by a queue with a wait time and a service time (for example, a processor that processes a request out of a queue). The delay center may be represented by a queue that does not include service time and instead only represents wait time. The distinction between the two resource types is that for a service center, the QOS data includes a number of visits, wait time per visit and service time per visit for incident detection and analysis. For the delay center, the number of visits and the wait time per visit at the delay center are used, as described below in detail.

Table I below provides an example of the various service and delay centers whose QOS data is used to track workload performance. Table I also identifies the resource type (i.e. utilization and/or latency type).

TABLE I

| Resource Name | Resource Description | Type |
| --- | --- | --- |
| CPU_N_Module | This resource identifies a queue where I/O requests wait for file protocol processing at an N-Module 214. As an example, there may be one queue for each node. | Utilization, Latency |
| CPU_D_Module | This resource identifies a queue where I/O requests wait for scheduling for being written to a storage device by the D-Module 216. As an example, there may be one queue for each node. | Utilization, latency |
| DISK_HDD_<Aggr_name> | This resource represents non-solid state physical storage devices in an aggregate, for example, hard drives, tapes and others. This provides an average view across all storage devices within an aggregate. As an example, there may be one queue for each aggregate to track this resource. | Utilization |
| DISK_SSD_<aggr_name> | This resource represents physical solid state storage devices (SSDs) in an aggregate. This provides an average view across all storage devices within the aggregate. As an example, there may be one queue for each aggregate to track this resource. | Utilization |
| DELAY_CENTER_WAFL_SUSP_DISKIO | This is a queue to represent the wait time for blocked disk I/O related file system suspensions. | Latency |
| DELAY_CENTER_WAFL_SUSP_CP | This is a queue to represent wait time for Consistency Point (CP) related suspensions by the file system. A CP will cause write requests to a block so that buffers can be cleared. | Latency |
| DELAY_CENTER_NETWORK | This is a queue that represents an external network wait time. At times, storage operating system 107 calls out an external entry to wait on something outside of the storage operating system to complete before the request can continue and this queue is used to track that wait time. There may be one delay center for an entire cluster. | Latency |

TABLE I-continued

| Resource Name | Resource Description | Type |
| --- | --- | --- |
| DELAY_CENTER_CLUSTER_INTERCONNECT | This queue is used to represents the wait time for transfers over a cluster interconnect. As an example, there may be one queue per cluster. | Latency |

Performance manager 121 uses the concept of workloads for analyzing QOS data for incident detection and analysis. Workloads are defined based on incoming I/O requests. As an example, a workload may include a plurality of streams. Each stream may have a plurality of requests. The requests may be generated by any entity, for example, an external entity, like a client system and/or an internal entity, for example, a replication engine that replicates storage volumes at one or more storage location.

A request may have a plurality of attributes, for example, a source, a path, a destination and I/O properties. The source identifies the source from where a request originates, for example, an internal process, a host or client address, a user application and others.

The path defines the entry path into the storage system. For example, a path may be a logical interface (LIF) or a protocol, such as NFS, CIFS, iSCSI and Fibre Channel protocol.

A destination is the target of a request, for example, storage volumes, LUNs, data containers and others.

I/O properties include operation type (i.e. read/write/other), request size and any other property.

In one aspect, streams may be grouped together based on client needs. For example, if a group of clients make up a department on two different subnets, then two different streams with the "source" restrictions can be defined and grouped within the same workload. Furthermore, requests that fall into a workload are tracked together by performance 121 for efficiency. Any requests that don't match a user or system defined workload may be assigned to a default workload.

In one aspect, workload streams may be defined based on the I/O attributes. The attributes may be defined by clients. Based on the stream definition, performance manager 121 tracks workloads.

Table II below provides a listing of the various objects with multiple instances that are used by the performance manager 121 for incident detection and analysis:

TABLE II

| Object | Instance | Purpose | Description |
| --- | --- | --- | --- |
| Workload | <workload_name> | Represents an external workload applied to a volume. The object may be used to measure workload performance against service levels. | Throughput, Average response time |
| Resource | <resource_name> | Provide hierarchical utilization of resources and may be a service or delay center. | Utilization |
| Resource_detail | <resource_name>. <workload_name> | Breakdowns resource usage by workload from a resource perspective. | Utilization |
| Workload_detail | <workload_name>. <service_center_name> | Breakdowns workload response time by resource. | Number of visits, service time per visit and wait time per visit |

Collection module 131 collects data using a plurality of counter objects. Data for these various object counters is collected from storage operating system 107. Table III below provides an example of the workload object counters:

TABLE III

| Workload Object Counters | Description |
| --- | --- |
| Ops | A workload's operations that are completed during a measurement (or poll) interval. |
| Read_ops | A workload's read operations that are completed during the measurement (or poll) interval. |
| Write_ops | A workload's write operations that are completed during the measurement (or poll) interval. |
| Total_data | The total data read and written per second by a workload. |
| Read_data | The data read per second by a workload. |
| Write_data | The data written per second by a workload. |
| Latency | The average response time for requests that were initiated by a workload. |

TABLE III-continued

| Workload Object Counters | Description |
| --- | --- |
| Read_latency | The average response time for read requests that were initiated by a workload. |
| Write_latency | The average response time for write requests that were initiated by a workload. |
| Read_done | The number of read done messages that were accumulated by the workload. |
| Wid | A workload ID. |
| Classified | Requests that were classified as part of a workload. |
| Read_IO_type | The percentage of reads served from various components (for example, buffer cache, ext_cache or disk). |
| Concurrency | Average number of concurrent requests for a workload. |
| Interarrival_time_sum_squares | Sum of the squares of the Inter-arrival time for requests of a workload. |
| Policy_group_name | The name of a policy-group of a workload. |
| Policy_group_uuid | The UUID (unique identifier) of the policy-group of a workload. |
| Data_object_type | The data object type on which a workload is defined. It is a string, one of vserver, volume, lun, file or node. |
| Data_object_name | The name of the lowest-level data object, which is part of the instance name as discussed above. When data_object_type is file, this will be the name of the file relative to its volume. |
| Data_object_uuid | The UUID of a vserver, volume or LUN on which this data object is defined. |
| Data_object_file_handle | The file handle of the file on which this data object is defined; or empty if data_object_type is not file. |

Table IV below provides an example of the details associated with the object counters that are collected by the collection module 131 as part of the QOS data.

TABLE IV

| Workload Detail Object Counter | Description |
| --- | --- |
| Visits | A number of visits to a physical resource per second; grouped by a service center. |
| Service_Time | A workload's average service time per visit to the service center. |
| Wait_Time | A workload's average wait time per visit to the service center. |
| In_latency_path | Determines whether or not service center-based statistics are in a latency path. |

Figure 4:
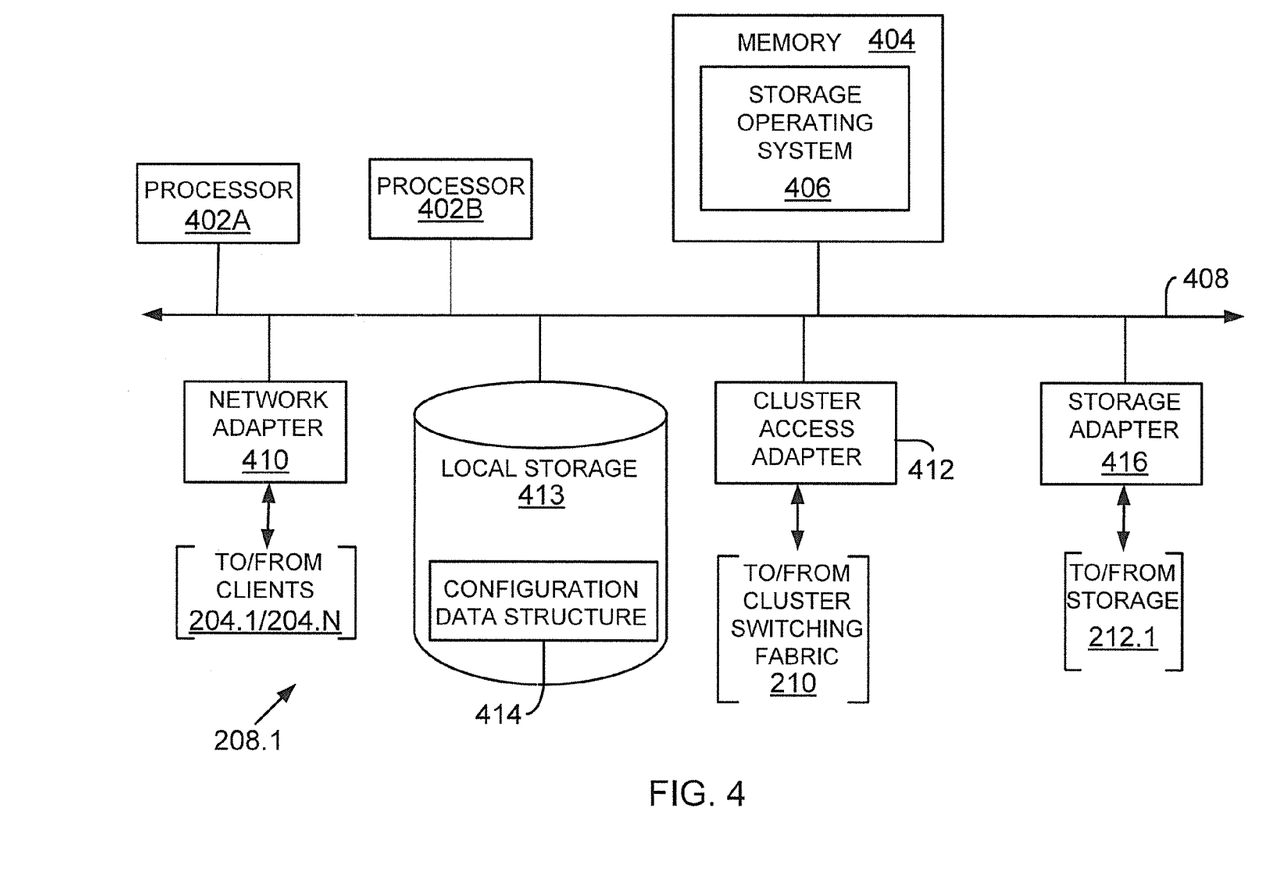
FIG. 4 shows an example of a storage system, used according to one aspect.

Storage System Node:

FIG. 4 is a block diagram of a node 208.1 that is illustratively embodied as a storage system comprising of a plurality of processors 402A and 402B, a memory 404, a network adapter 410, a cluster access adapter 412, a storage adapter 416 and local storage 417 interconnected by a system bus 408. Node 208.1 may be used to provide QOS information to collection module 131 described above.

Processors 402A-402B may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware devices. The local storage 413 comprises one or more storage devices utilized by the node to locally store configuration information for example, in a configuration data structure 414. The configuration information may include information regarding storage volumes and the QOS associated with each storage volume.

The cluster access adapter 412 comprises a plurality of ports adapted to couple node 208.1 to other nodes of cluster 202. In the illustrative aspect, Ethernet may be used as the clustering protocol and interconnect media, although it will be apparent to those skilled in the art that other types of protocols and interconnects may be utilized within the cluster architecture described herein. In alternate aspects where the N-modules and D-modules are implemented on separate storage systems or computers, the cluster access adapter 412 is utilized by the N/D-module for communicating with other N/D-modules in the cluster 202.

Each node 208.1 is illustratively embodied as a dual processor storage system executing a storage operating system 406 (similar to 107, FIG. 1) that preferably implements a high-level module, such as a file system, to logically organize the information as a hierarchical structure of named directories and files at storage 212.1. However, it will be apparent to those of ordinary skill in the art that the node 208.1 may alternatively comprise a single or more than two processor systems. Illustratively, one processor 402A executes the functions of the N-module on the node, while the other processor 402B executes the functions of the D-module.

The memory 404 illustratively comprises storage locations that are addressable by the processors and adapters for storing programmable instructions and data structures. The processor and adapters may, in turn, comprise processing elements and/or logic circuitry configured to execute the programmable instructions and manipulate the data structures. It will be apparent to those skilled in the art that other processing and memory means, including various computer readable media, may be used for storing and executing program instructions pertaining to the disclosure described herein.

The storage operating system 406 portions of which is typically resident in memory and executed by the processing elements, functionally organizes the node 208.1 by, inter alia, invoking storage operation in support of the storage service implemented by the node.

The network adapter 410 comprises a plurality of ports adapted to couple the node 208.1 to one or more clients 204.1/204.N over point-to-point links, wide area networks, virtual private networks implemented over a public network (Internet) or a shared local area network. The network adapter 410 thus may comprise the mechanical, electrical and signaling circuitry needed to connect the node to the network. Each client 204.1/204.N may communicate with the node over network 206 (FIG. 2A) by exchanging discrete frames or packets of data according to pre-defined protocols, such as TCP/IP.

The storage adapter 416 cooperates with the storage operating system 406 executing on the node 208.1 to access information requested by the clients. The information may be stored on any type of attached array of writable storage device media such as video tape, optical, DVD, magnetic tape, bubble memory, electronic random access memory, micro-electro mechanical and any other similar media adapted to store information, including data and parity information. However, as illustratively described herein, the information is preferably stored at storage device 212.1. The storage adapter 416 comprises a plurality of ports having input/output (I/O) interface circuitry that couples to the storage devices over an I/O interconnect arrangement, such as a conventional high-performance, Fibre Channel link topology.

Figure 5:
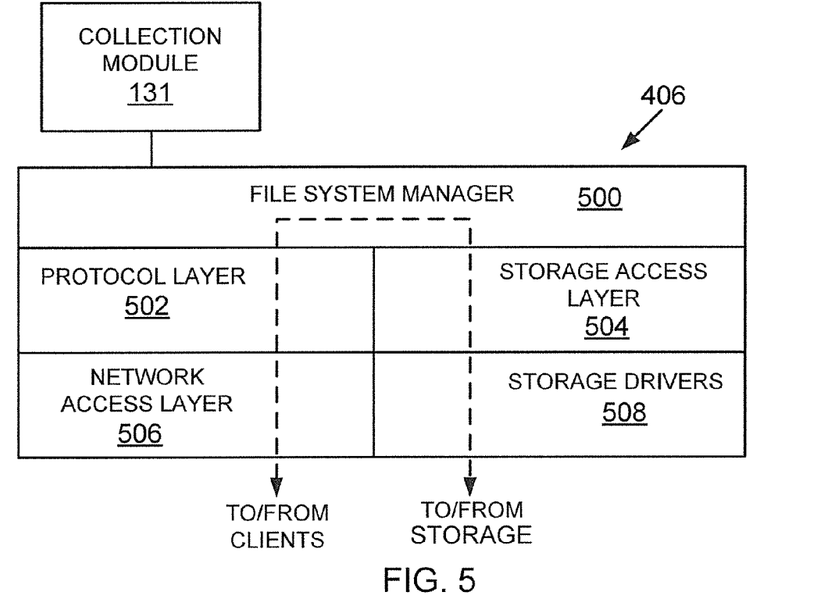
FIG. 5 shows an example of a storage operating system, used according to one aspect.

Operating System:

FIG. 5 illustrates a generic example of storage operating system 406 (or 107, FIG. 1) executed by node 208.1, according to one aspect of the present disclosure. The storage operating system 406 interfaces with the QOS module 109 and the collection manager 131 for providing QOS data, as described above.

In one example, storage operating system 406 may include several modules, or "layers" executed by one or both of N-Module 214 and D-Module 216. These layers include a file system manager 500 that keeps track of a directory structure (hierarchy) of the data stored in storage devices and manages read/write operation, i.e. executes read/write operation on storage in response to client 204.1/204.N requests.

Storage operating system 406 may also include a protocol layer 502 and an associated network access layer 506, to allow node 208.1 to communicate over a network with other systems, such as clients 204.1/204.N. Protocol layer 502 may implement one or more of various higher-level network protocols, such as NFS, CIFS, Hypertext Transfer Protocol (HTTP), TCP/IP and others.

Network access layer 506 may include one or more drivers, which implement one or more lower-level protocols to communicate over the network, such as Ethernet. Interactions between clients' and mass storage devices 212.1-212.3 (or 114) are illustrated schematically as a path, which illustrates the flow of data through storage operating system 406.

The storage operating system 406 may also include a storage access layer 504 and an associated storage driver layer 508 to allow D-module 216 to communicate with a storage device. The storage access layer 504 may implement a higher-level storage protocol, such as RAID (redundant array of inexpensive disks), while the storage driver layer 508 may implement a lower-level storage device access protocol, such as Fibre Channel or SCSI. The storage driver layer 508 may maintain various data structures (not shown) for storing information regarding storage volume, aggregate and various storage devices.

As used herein, the term "storage operating system" generally refers to the computer-executable code operable on a computer to perform a storage function that manages data access and may, in the case of a node 208.1, implement data access semantics of a general purpose operating system. The storage operating system can also be implemented as a microkernel, an application program operating over a general-purpose operating system, such as UNIX® or Windows XP®, or as a general-purpose operating system with configurable functionality, which is configured for storage applications as described herein.

In addition, it will be understood to those skilled in the art that the disclosure described herein may apply to any type of special-purpose (e.g., file server, filer or storage serving appliance) or general-purpose computer, including a stand-alone computer or portion thereof, embodied as or including a storage system. Moreover, the teachings of this disclosure can be adapted to a variety of storage system architectures including, but not limited to, a network-attached storage environment, a storage area network and a storage device directly-attached to a client or host computer. The term "storage system" should therefore be taken broadly to include such arrangements in addition to any subsystems configured to perform a storage function and associated with other equipment or systems. It should be noted that while this description is written in terms of a write any where file system, the teachings of the present disclosure may be utilized with any suitable file system, including a write in place file system.

Figure 6:
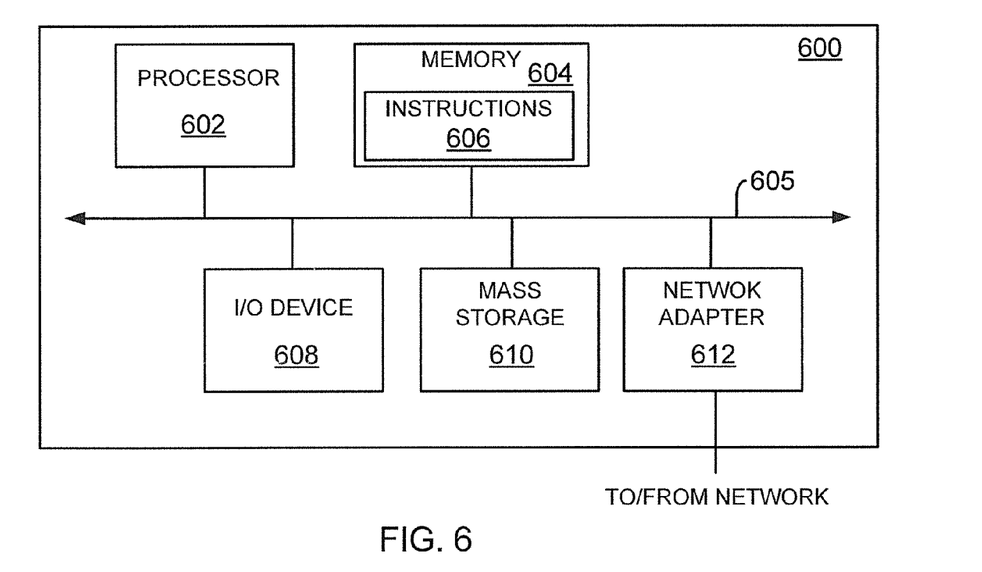
FIG. 6 shows an example of a processing system, used according to one aspect.

Processing System:

FIG. 6 is a high-level block diagram showing an example of the architecture of a processing system 600 that may be used according to one aspect. The processing system 600 can represent collection module 131, performance manager 121, host system 102, management console 118, clients 116, 204, or storage system 108. Note that certain standard and well-known components which are not germane to the present aspects are not shown in FIG. 6.

The processing system 600 includes one or more processor(s) 602 and memory 604, coupled to a bus system 605. The bus system 605 shown in FIG. 6 is an abstraction that represents any one or more separate physical buses and/or point-to-point connections, connected by appropriate bridges, adapters and/or controllers. The bus system 605, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processor(s) 602 are the central processing units (CPUs) of the processing system 600 and, thus, control its overall operation. In certain aspects, the processors 602 accomplish this by executing instructions stored in memory 604. Processor 602 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 604 represents any form of random access memory (RAM), read-only memory (ROM), flash memory, or the like, or a combination of such devices. Memory 604 includes the main memory of the processing system 600. Instructions 606 implement the process steps described above with respect to FIG. 3A may reside in and executed by processors 602 from memory 604. Instructions 606 may also be used to implement the forecasting module 223, detection module 225 and incident analysis module 227, according to one aspect.

Also connected to the processors 602 through the bus system 605 are one or more internal mass storage devices 610, and a network adapter 612. Internal mass storage devices 610 may be, or may include any conventional medium for storing large volumes of data in a non-volatile manner, such as one or more magnetic or optical based disks. The network adapter 612 provides the processing system 600 with the ability to communicate with remote devices (e.g., storage servers) over a network and may be, for example, an Ethernet adapter, a Fibre Channel adapter, or the like.

The processing system 600 also includes one or more input/output (I/O) devices 608 coupled to the bus system 605. The I/O devices 608 may include, for example, a display device, a keyboard, a mouse, etc.

Thus, a method and apparatus for collecting and pre-processing QOS data have been described. Note that references throughout this specification to "one aspect" or "an aspect" mean that a particular feature, structure or characteristic described in connection with the aspect is included in at least one aspect of the present disclosure. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A machine implemented method, comprising:

notifying a hardware based, processor executable collection module by a hardware based processor executable performance manager, a time interval for collecting quality of service (QOS) data for a plurality of storage volumes of a networked storage system; wherein the performance manager monitors performance of a plurality of resources of the networked storage system for predicting expected response and detecting abnormal performance of the plurality of resources based on QOS data collected by the collection module;

initiating by the collection module QOS data collection for a first poll at a first time t1 based on the time interval defined by the performance manager;

receiving QOS data for the first poll by the collection module from a processor executable, storage operating system of a storage system node of the networked storage system for the plurality of storage volumes at a second time, t2, when a process for collecting the QOS data began at the first time t1 such that t2 occurs subsequent in time with respect to t1; wherein the storage operating system maintains a plurality of counters for tracking QOS data associated with resources of the networked storage system and the collection module maintains counter objects that are updated when associated QOS data is received from the storage operating system; and wherein the collection module suppresses null data received from the storage operating system and does not provide the null data to the performance manager, where null data indicates that a counter value has not changed from a previous interval;

initiating by the collection module QOS data collection for a second poll at a third time t3 based on the time interval defined by the performance manager;

receiving QOS data by the collection module for the second poll at a fourth time t4, where t4 occurs subsequent to t3;

estimating a QOS data value by the collection module for the first poll at time t1 based on collected QOS data at times t2 and t4;

initiating by the collection module QOS data collection for a third poll at a fifth time t5 based on the time interval defined by the performance manager;

receiving QOS data by the collection module for the third poll at a sixth time t6 that occurs after time t5;

estimating a QOS data value by the collection module for the second poll at time t3 based on collected QOS data at times t4 and t6;

generating an estimated QOS data value for the third poll at time t5 using the estimated values for the first poll and the second poll; and providing the estimated QOS data value without any null data for the third poll to the performance manager that uses the estimated QOS data value for monitoring QOS for the plurality of storage volumes using the plurality of resources for processing input/output (I/O) requests, predicting expected QOS data range and detecting abnormal incidents associated with the plurality of resources.

2. The method of claim 1, wherein the QOS data includes an average response time in which each of the plurality of storage volumes respond to an I/O request.

3. The method of claim 1, wherein the QOS data includes a wait time for each I/O request at each of the plurality of resources.

4. The method of claim 1, wherein the QOS data includes a number of visits and a service time for each I/O request at the plurality of resources.

5. The method of claim 1, wherein the resources at the storage system are categorized as a service center that services a request and a delay center that only moves the request to a next destination.

6. The method of claim 1, wherein the collection module uses linear extrapolation for determining the estimated QOS data value.

7. A non-transitory, machine readable storage medium storing executable instructions, which when executed by a machine, causes the machine to perform a method, the method comprising:

notifying a hardware based, processor executable collection module by a hardware based processor executable performance manager, a time interval for collecting quality of service (QOS) data for a plurality of storage volumes of a networked storage system; wherein the performance manager monitors performance of a plurality of resources of the networked storage system for predicting expected response and detecting abnormal performance of the plurality of resources based on QOS data collected by the collection module;

initiating by the collection module QOS data collection for a first poll at a first time t1 based on the time interval defined by the performance manager;

receiving QOS data for the first poll by the collection module from a processor executable, storage operating system of a storage system node of the networked storage system for the plurality of storage volumes at a second time, t2, when a process for collecting the QOS data began at the first time t1 such that t2 occurs subsequent in time with respect to t1; wherein the storage operating system maintains a plurality of counters for tracking QOS data associated with resources of the networked storage system and the collection module maintains counter objects that are updated when associated QOS data is received from the storage operating system; and wherein the collection module suppresses null data received from the storage operating system and does not provide the null data to the performance manager, where null data indicates that a counter value has not changed from a previous interval;

initiating by the collection module QOS data collection for a second poll at a third time t3 based on the time interval defined by the performance manager;

receiving QOS data by the collection module for the second poll at a fourth time t4, where t4 occurs subsequent to t3;

estimating a QOS data value by the collection module for the first poll at time t1 based on collected QOS data at times t2 and t4;

initiating by the collection module QOS data collection for a third poll at a fifth time t5 based on the time interval defined by the performance manager;

receiving QOS data by the collection module for the third poll at a sixth time t6 that occurs after time t5;

estimating a QOS data value by the collection module for the second poll at time t3 based on collected QOS data at times t4 and t6;

generating an estimated QOS data value for the third poll at time t5 using the estimated values for the first poll and the second poll; and providing the estimated QOS data value for the third poll to the performance manager that uses the estimated QOS data value for monitoring QOS for the plurality of storage volumes using the plurality of resources for processing input/output (I/O) requests predicting expected QOS data range and detecting abnormal incidents associated with the plurality of resources.

8. The storage medium of claim 7, wherein the QOS data includes an average response time in which each of the plurality of storage volumes respond to an I/O request.

9. The storage medium of claim 7, wherein the QOS data includes a wait time for each I/O request at each of the plurality of resources.

10. The storage medium of claim 7, wherein the QOS data includes a number of visits and a service time for each I/O request at the plurality of resources.

11. The storage medium of claim 7, wherein the resources at the storage system are categorized as a service center that services a request and a delay center that only moves the request to a next destination.

12. The storage medium of claim 7, wherein the collection module uses linear extrapolation for determining the estimated QOS data value.

13. A system, comprising:
a memory containing machine readable medium comprising machine executable code having stored thereon instructions; and a processor module of a collection module coupled to the memory and, the processor module configured to execute the machine executable code to:
receive from a hardware based processor executable performance manager, a time interval for collecting quality of service (QOS) data for a plurality of storage volumes of a networked storage system; wherein the performance manager monitors performance of a plurality of resources of the networked storage system for predicting expected response and detecting abnormal performance of the plurality of resources based on QOS data collected by the collection module;

initiate QOS data collection for a first poll at a first time t1 based on the time interval defined by the performance manager;

receive QOS data for the first poll from a processor executable, storage operating system of a storage system node of the networked storage system for the plurality of storage volumes at a second time, t2, when a process for collecting the QOS data began at the first time t1 such that t2 occurs subsequent in time with respect to t1; wherein the storage operating system maintains a plurality of counters for tracking QOS data associated with resources of the networked storage system and the collection module maintains counter objects that are updated when associated QOS data is received from the storage operating system; and wherein the collection module suppresses null data received from the storage operating system and does not provide the null data to the performance manager, where null data indicates that a counter value has not changed from a previous interval;

initiate QOS data collection for a second poll at a third time t3 based on the time interval defined by the performance manager;

receive QOS data for the second poll at a fourth time t4, where t4 occurs subsequent to t3;

estimate a QOS data value for the first poll at time t1 based on collected QOS data at times t2 and t4;

initiate QOS data collection for a third poll at a fifth time t5 based on the time interval defined by the performance manager;

receive QOS data for the third poll at a sixth time t6 that occurs after t5;

estimate a QOS data value for the second poll at time t3 based on collected QOS data at times t4 and t6;

generate a QOS data value for the third poll at time t5 using the estimated values of the first poll and the second poll; and providing the estimated QOS data value for the third poll to the performance manager that uses estimated QOS data values for monitoring QOS for the plurality of storage volumes using the plurality of resources for processing input/output (I/O) requests predicting expected QOS data range and detecting abnormal incidents associated with the plurality of resources.

14. The system of claim 13, wherein the QOS data includes an average response time in which each of the plurality of storage volumes respond to an I/O request.

15. The system of claim 13, wherein the QOS data includes a wait time for each I/O request at each of the plurality of resources.

16. The system of claim 13, wherein the QOS data includes a number of visits and a service time for each I/O request at the plurality of resources.

17. The system of claim 13, wherein the collection module uses linear extrapolation for determining the estimated QOS data value.

* * * * *